United States Patent [19]

Ota

[11] Patent Number: 5,107,703
[45] Date of Patent: Apr. 28, 1992

[54] TIRE UNIFORMITY MACHINE

[75] Inventor: Akitoshi Ota, Kobe, Japan

[73] Assignee: Kabushiki Kaisha Kobe Seiko Sho, Kobe, Japan

[21] Appl. No.: 608,843

[22] Filed: Nov. 5, 1990

[30] Foreign Application Priority Data

Nov. 6, 1989 [JP] Japan .................................. 1-288530

[51] Int. Cl.$^5$ .......................................... G01M 17/02
[52] U.S. Cl. ............................................. 73/146; 73/8
[58] Field of Search .................. 73/146, 9, 8; 157/21, 157/14, 16, 20

[56] References Cited

U.S. PATENT DOCUMENTS

| | | |
|---|---|---|
| 4,574,628 | 3/1986 | Maikuma et al. ............. 73/146 |
| 4,971,128 | 11/1990 | Koga et al. ................... 73/146 |

*Primary Examiner*—Donald O. Woodiel
*Attorney, Agent, or Firm*—Oblon, Spivak, McClelland, Maier & Neustadt

[57] ABSTRACT

A rim mounting mechanism for a tire uniformity machine has on the side of upper and lower spindles thereof an upper rim and a lower rim to be fitted in bead portions of a tire, respectively, and arranged to lift up the tire by a tire transfer means, grip the tire from the upper and lower sides thereof by means of the upper and lower rims and rotate the tire T about its axis by rotation of the upper spindle about the axis thereof. The rim mounting mechanism includes a rim assembly transfer device delivering a rim assembly R, formed by assembling together an upper rim, a lower rim and a lower spindle at a place outside the machine, to a position above the tire transfer device and in vertical alignment with the axis of the upper spindle and to dismantle a tested tire from the machine at a position immediately beneath the upper spindle.

8 Claims, 7 Drawing Sheets

FIG. 6(III)

FIG. 8 ced size of major components of the machine of FIG. 1;

TIRE UNIFORMITY MACHINE

BACKGROUND OF THE INVENTION

1. Field of the Invention

This invention relates to a rim mounting mechanism for a tire uniformity machine to be used for inspection in a finishing stage of the tire manufacturing process.

2. Description of the Related

There has been known in the art, for example, from Japanese Patent Publication No. 63-48699, a tire uniformity machine which is provided with upper and lower rims on the sides of upper and lower spindles, respectively, to grip therebetween a tire which has been lifted up from a tire delivering conveyer, for rotating the tire about its axis through rotation of the upper spindle about the axis thereof.

The tire uniformity machine of the above-mentioned patent publication employs a rim setting mechanism which is arranged to assemble an upper rim with a lower rim and a lower spindle under the tire delivering conveyer and then lift up and mount the resulting rim assembly on the upper spindle.

More specifically, an assembling table with a plural number of holder holes is movably located under the tire conveyer for selectively locating one of the holder holes in a position in vertical alignment with the upper spindle. The assembling table is located to maintain the upper rim, the lower rim and the lower spindle in the holder hole in such a manner that their opposing faces are held at a level higher than the assembled height.

A lift cylinder is provided under the assembling table in vertical alignment with the upper spindle axis, and has a lifting rod which is movable up and down through the holder hole for lifting up the rim assembly. The rim assembly which has been set up and retained on the assembling table prior to tire fitting is lifted up in the assembled state by operation of the lifting rod to mount the upper rim on the upper spindle. Thereafter, while leaving the upper rim on the upper spindle, the lower rim and lower spindle are lowered together by a downward movement of the lifting rod. In the next place, a tire is delivered onto the conveyer and, after fitting one bead portion of the tire on the lower rim, the lifting rod is moved upward to lift up the tire together with the lower spindle, fitting from beneath the other bead portion on the upper rim to grip the tire between the upper and lower rims.

In order to remove the tire and rim assembly from the upper spindle for replacement, the above-described steps of the mounting procedure are performed in a reversed order, and then a substitute rim assembly of a different size is mounted again according to the above-described steps.

The above-described conventional apparatus, which is arranged to perform the rim assembling and replacing jobs under the tire delivering conveyer, requires a large space between the conveyer and the lift cylinder, increasing the total height of the machine and the stroke length of the lifting rod, which will be reflected by an elongated operational cycle time and a large-scale machine design.

SUMMARY OF THE INVENTION

In view of the foregoing situations, the present invention has as its object the provision of a rim mounting mechanism for tire uniformity machine, which is arranged to reduce the space under the tire transfer means for the purpose of minimizing the total height of the machine and shortening the operational cycle time through reduction of the stroke length of the lifting rod.

In accordance with the present invention, there is provided, for achieving the above-stated objective, a rim mounting mechanism for a tire uniformity machine of the sort having on the side of upper and lower spindles thereof an upper rim and a lower rim to be fitted in bead portions of a tire, respectively, and arranged to lift up the tire by a tire transfer means, grip the tire from the upper and lower sides thereof by means of the upper and lower rims and rotate the tire T about its axis by rotation of the upper spindle about the axis thereof, characterized in that the rim mounting mechanism comprises a rim assembly transfer means adapted to deliver a rim assembly R, formed by assembling together an upper rim, a lower rim and a lower spindle at a place outside the machine, to a position above the tire transfer means and in vertical alignment with the axis of the upper spindle and to dismantle a tested tire from the machine at a position immediately beneath the upper spindle.

According to the present invention, a rim assembly is prepared by assembling an upper rim, a lower rim and a lower spindle together at a place outside the machine, and delivered by a rim assembly transfer means onto a lift means at a position above the tire transfer means and in vertical alignment with the axis of the upper spindle, and then the lift means is moved upward until the upper rim is fittingly engaged with the upper spindle, whereupon the lower rim and lower spindle are lowered by a downward movement of the lift means to a position below the tire transfer means. Nextly, a tire is advanced to a position immediately beneath the upper spindle by the tire transfer means, followed by an upward movement of the lift means to fit the lower rim in one bead portion of the tire, lifting up the tire together with the lower spindle 5 until the other bead of the tire fits on the upper rim on the upper spindle from beneath. As a result, the tire is gripped from the upper and lower sides thereof by the upper and lower rims.

Upon finishing a test on the tire, the lift means is lowered, whereupon the tire is separated from the upper rim and then from the lower rim and put on the tire transfer means which dismantles the tire from the machine. Nextly, a fresh testing tire is delivered to a position immediately beneath the upper spindle, and the lift means is moved upward to mount the tire on the upper spindle by gripping it between the upper and lower rims in the same manner as described above.

When replacing the rim assembly R to cope with a change in tire size, the rim assembly R can be removed from the upper spindle by performing the above-described mounting steps in reversed order.

The above and other objects, features and advantages of the invention will become apparent from the following description and the appended claims, taken in conjuction with the accompanying drawings which show by way of example some preferred embodiments of the invention.

BRIEF DESCRIPTION OF THE DRAWINGS

In the accompanying drawings:

FIGS. 6(I) to 6(VI) are schematic views explanatory of the steps for mounting the rim assembly and a tire on the tire uniformity machine;

DESCRIPTION OF PREFERRED EMBODIMENTS

Hereafter, the invention is described more particularly by way of the embodiments shown in the drawings.

Figure 1:
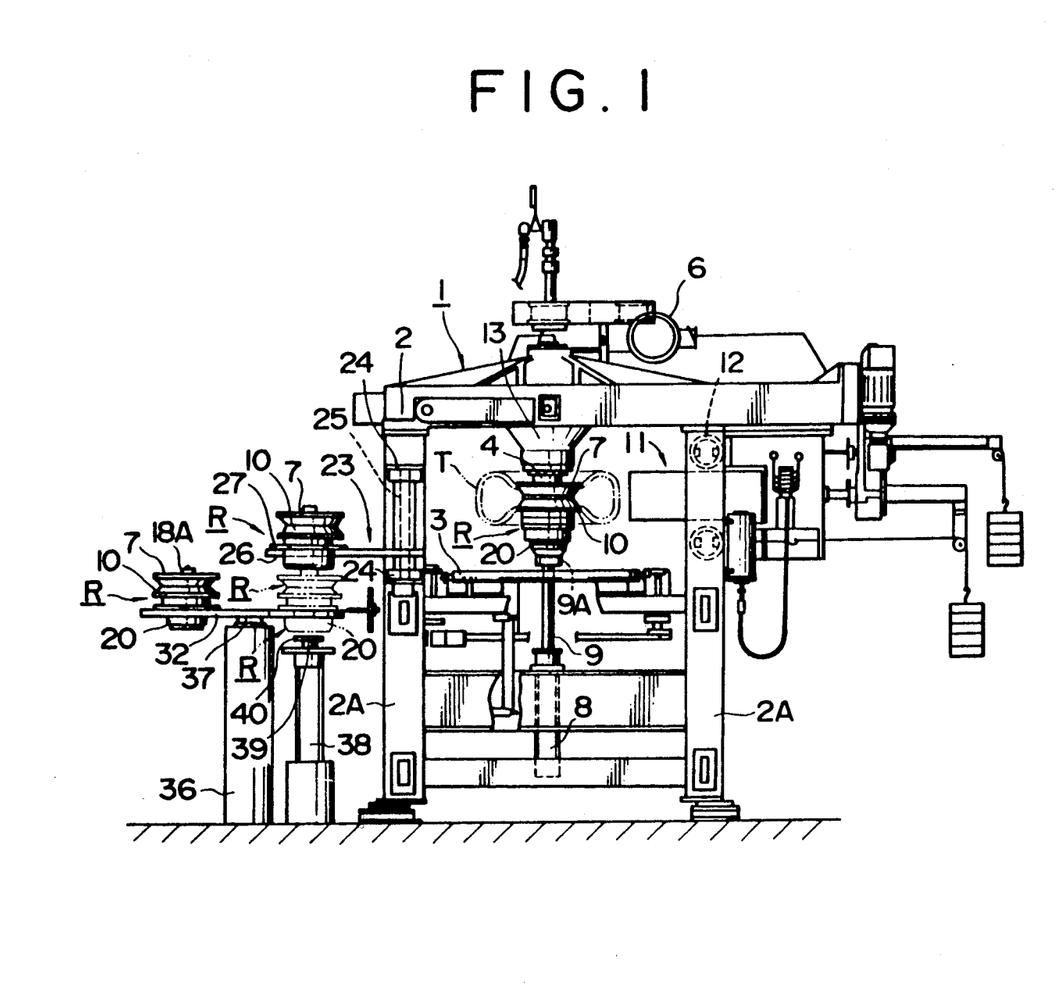
FIG. 1 is a schematic front view of a tire uniformity machine as a whole.
Figure 2:
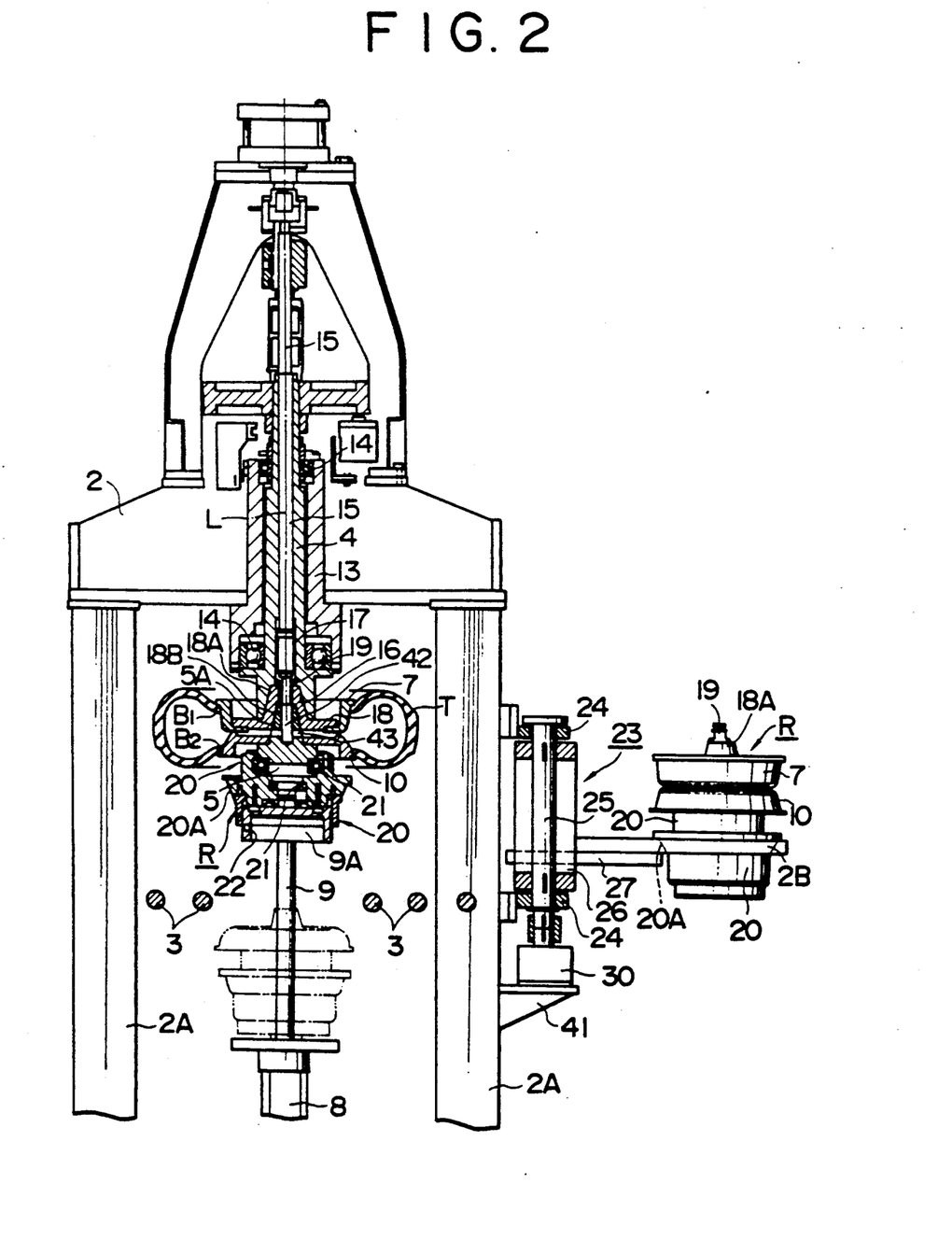
FIG. 2 is a partly sectioned side view on an enlarged scale of major components of the machine of FIG. 1.

Referring to FIGS. 1 and 2, there is shown a tire uniformity machine 1 incorporating the present invention, including a roller conveyer 3 provided on a frame 2 to serve as a tire transfer means, and upper and lower spindles 4 and 5 which are located in vertical alignment with each other and in concentric relation with the axis of the tire. The upper spindle 4 is rotated by a rotational drive mechanism 6 which is mounted on the frame 2, and an upper rim 7 is detachably mounted on the lower end of the upper spindle 4. The lower spindle 5 is supported through a fitting head 9A by piston rod 9 of a hydraulic cylinder 8 which is employed as a lift means, and a lower rim 10 is retained on the upper end of the lower spindle 5. The upper and lower rims 7 and 10 are fitted in bead portions $B_1$ and $B_2$ of a tire T to grip the latter therebetween. By rotation of the upper spindle 4, the lower spindle 5 is rotated together with the tire T and the upper and lower rims 7 and 10. In these figures, indicated at 11 is a load-applying mechanism and at 12 is a load detector, which are both mounted on the frame 2.

The upper spindle 4 is rotatably supported in a tubular spindle holder 13, which is fixed on the frame 2, for rotation about its axis through a bearing 14. A rim locking rod 15 is inserted in the spindle holder 13 for vertical movements therein. The spindle 4 is provided with a tapered rim fitting hole 16 at its open lower end which is provided with a lock means 17 (e.g., a collet chuck) for automatically locking and releasing the upper rim 7 through one-touch action.

The upper rim 7 is fixed to a rim mounting flange 18 which is provided with a conical fitting projection 18A centrally on its upper side for engagement with the rim fitting hole 16 in the upper spindle 4, and a lower spindle fitting hole of a conical shape formed into the projection 18A from the lower side thereof. The fitting projection 18A is provided with an upwardly projecting coupling member 19 which is releasably engageable with the above-described lock means 17 through one-touch action.

The lower spindle 5 has its lower portion rotatably supported in a spindle holder 20 through a bearing 21 for rotation about its axis. The lower spindle portion which is protruded from the upper end of the spindle holder 20 is formed into a conical fitting portion 5A for engagement with the fitting hole 18B in the rim mounting flange 18. The lower rim 10 is placed on a flange 4B and fixed to the latter by bolts or other suitable fixation means (not shown). The spindle holder 20 is provided with a tapered fitting body portion 20A on its circumference to be fittingly supported by a transfer slide table and a rim rack as will be described hereinlater, and a fitting hole 22 formed on the lower side thereof for engagement with the fitting head 9A.

The rim mounting flange 18 of the upper rim 7 is fitted and supported on the fitting shaft portion 5A of the lower spindle 5, forming a rim assembly R by the upper and lower rims 7 and 10 and the lower spindle 5. The rim assembly is prepared on a rim rack which is located outside the machine, by assembling these components together.

Figure 3:
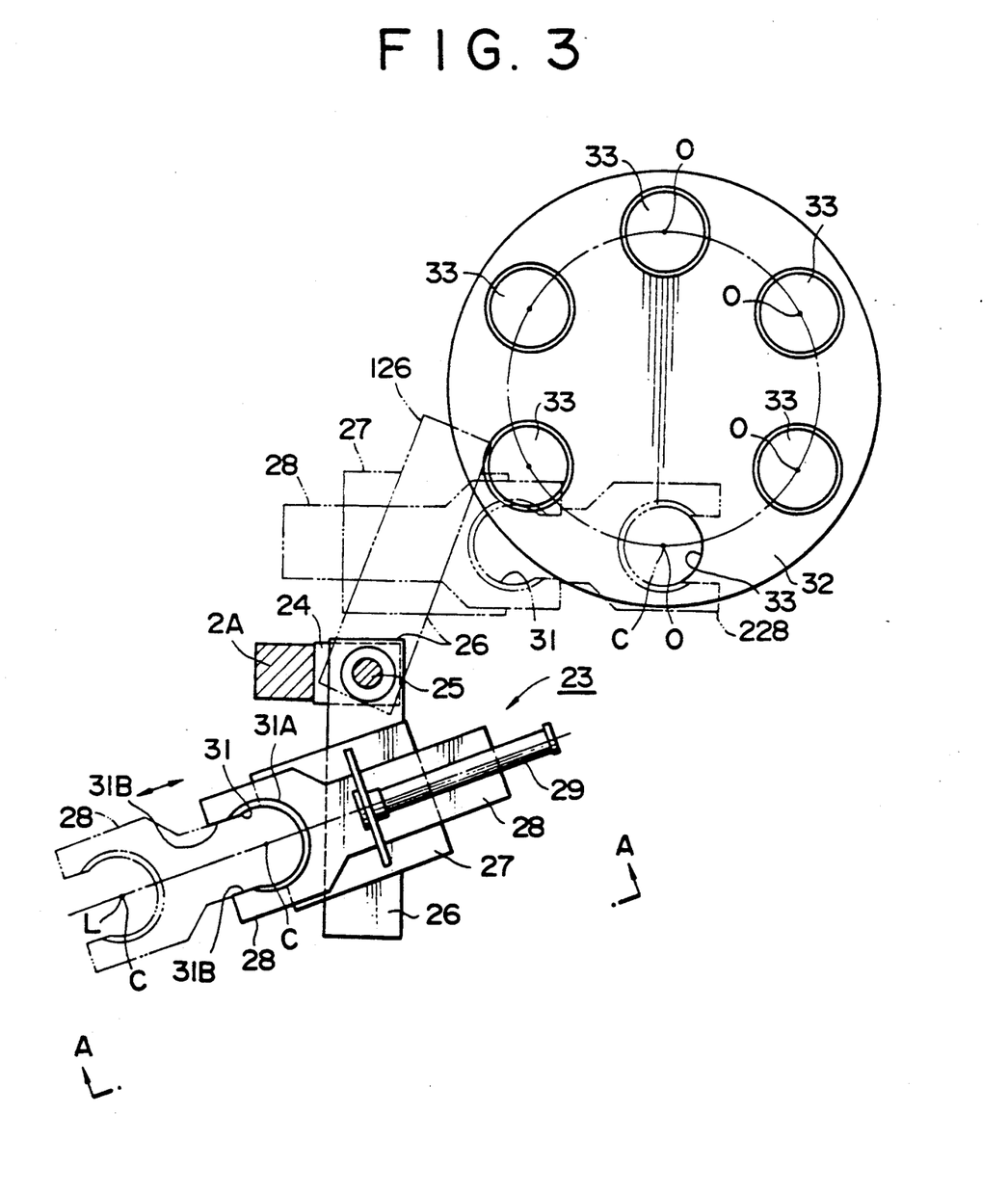
FIG. 3 is an enlarged plan view of a rim assembly transfer means.
Figure 4:
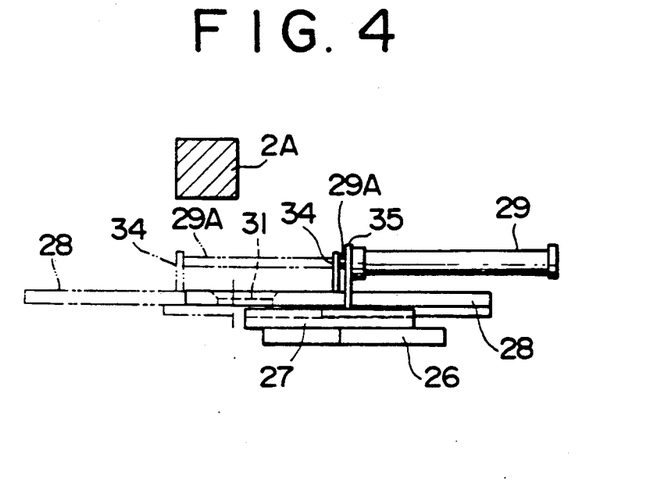
FIG. 4 is a view taken on line A—A of FIG. 3.

Designated at 23 is a rim assembly transfer means which is constituted by a rotational shaft 25 which is rotatably mounted on and along the outer side of a vertical member 2A and supported by bearings 24 at the upper end lower ends thereof, a rotary arm 26 which has one end thereof fixedly connected to the rotational shaft 25, a slide plate 27 which is fixedly connected to the other end of the rotary arm 26, a slide table 28 and a slide drive means such as an air cylinder 29 which are slidably mounted on the slide plate 27, and a rotary actuator which is connected to the lower end of the rotational shaft (FIGS. 3 and 4).

The slide table 28 is provided with a spigot socket 31 in a fore end portion thereof, the spigot socket 31 having a tapered portion 31A in which the spindle holder 20 of the lower spindle 5 is to be fittingly placed, and a notch 31B at the fore end thereof to facilitate the engagement and disengagement with the rim assembly R. When the rotary arm 26 is turned parallel with the machine side and the slide table 28 is slid through operation of the air cylinder 29, for introducing the rim assembly onto the roller conveyor 3 immediately beneath the upper spindle 4 on the machine, the center C of the spigot socket 31 is brought into a position in alignment with the extension line L of the axis of the upper spindle 4. On the other hand, when the rotary arm 26 is turned into a position outside the machine and the slide table 28 is slidingly extended out through operation of the air cylinder 29, the center C of the spigot socket 31 is brought into a position in alignment with the center O of a rim assembly support hole 33 of the rim rack as will be described hereinlater.

Indicated at 34 is a drive bracket for the slide table 28, which is connected to the outer end of rod 29A of the air cylinder 29 which is fixed on the slide plate 27 through a bracket 35.

Figure 5:
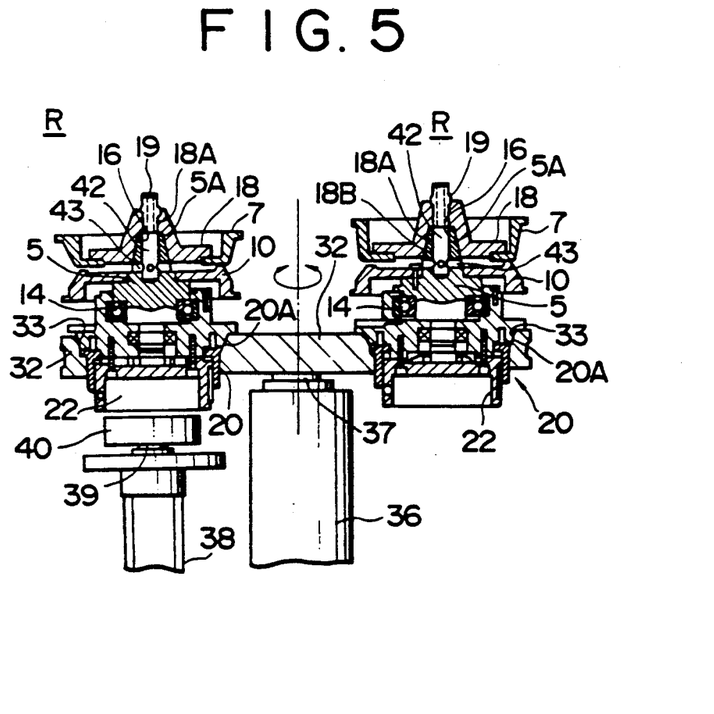
FIG. 5 is a vertically section of a rim rack and a rim assembly supported thereon.

In this embodiment, the rim rack is in the form of a rotary table which is provided with six rim assembly support holes 33 each having a tapered shape for fittingly receiving the correspondingly tapered body portion 20A of the lower spindle 5, and rotatably supported on a support column 36 through a vertical shaft 37 (FIG. 5).

A rim assembly transfer cylinder 38, shown in FIGS. 1 through 5, is fixed in an upright position immediately beneath the center O of the rim assembly support hole 33, which is in turn in alignment with the center C of the spigot socket 31 on the slide table 28 as seen in FIG. 3. Securely fixed to the upper end of rod 39 of the cylinder 38 is a support head 40 which is to be brought into and out of fitting engagement with the fitting hole 22 in the lower spindle holder 20.

The reference numeral 41 denotes a bracket which is employed to support the rotary actuator 30.

The lower spindle 5 is provided with air passages 42 and 43 for introducing pressurized air into the tire T.

Although not shown in the drawings, compressed air is supplied through air passages which are provided in the rod 15, lock means 17 and coupling member 19.

Figure 6:
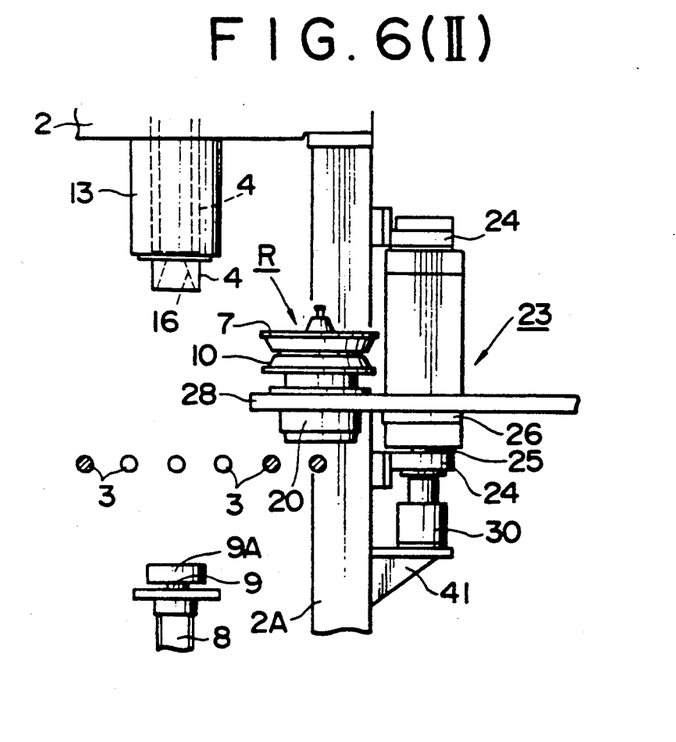
Figure 6I:
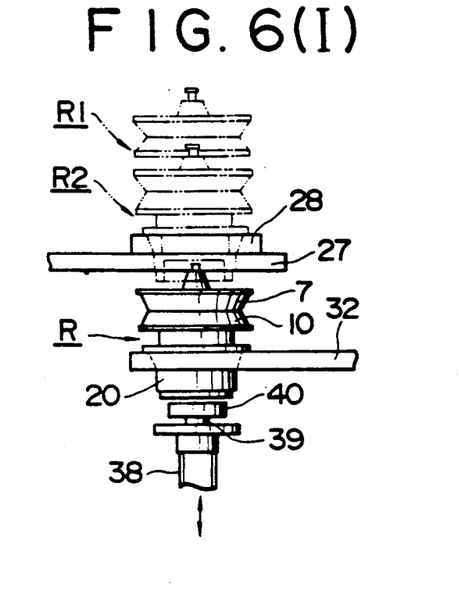

Referring to FIGS. 6(I) to 6(VI) which illustrate various operational phases of the rim mounting mechanism, a suitable number of sets of rim assemblies R corresponding to tires T of various sizes and shapes are assembled beforehand on the rim rack 32, and fittingly supported in the respective support holes 33, positioning immediately above the rim assembly handling cylinder 38 a rim assembly which corresponds to the tire T to be tested. In the next place, the rotary actuator 30 of the rim assembly transfer means 23 is operated to turn the rotary arm 26 to a position outside the machine and stop it there, while receding the slide table 28 to a stand-by position by operation of the air cylinder 29. Then, the rim assembly R which is located in a position on the extension line of the center axis O of the handing cylinder 38 is lifted up to the position indicated by two-dot chain line R1 in FIG. 6(I) by moving upward the rod 39 of the handing cylinder 38 until the support head 40 is fitted into the fitting hole 22 of the lower spindle 5 to support same.

Thereafter, the slide table 28 is advanced by operation of the air cylinder 29 to position the center C of the spigot socket portion 31 on the extension line of the center axis O of the handing cylinder 38, and then the rod 39 of the cylinder 38 is lowered again to fit the body portion 20A of the lower spindle 5 in the spigot socket portion 31 thereby holding the rim assembly R in the position indicated by two-dot chain line R2 in FIG. 6(I). As a result of these operations, the rim assembly R is handed over from the rim rack 32 to the rim assembly transfer means 23, and the rod 39 is returned to its lower limit position.

Succeedingly, the rotary actuator 30 is operated to turn the rotary arm 26 toward the machine, while simultaneously the slide table 28 is retracted by the air cylinder 29 and stopped in the position indicated by solid line in FIGS. 6(II) and 3. Thereafter, the air cylinder 29 is operated again to advance the slide table 28 onto the roller conveyer 3, bringing the center of the lower spindle 5 of the rim assembly R into alignment with the extension line of the axis of the upper spindle 4 as shown in FIG. 6(III).

In this state, the hydraulic cylinder 8 is operated to extend its rod 9 upward beyond the roller conveyer 3 (which has an opening for passing the rim assembly R), causing its fitting head 9A to plunge into the fitting hole 22 of the lower spindle holder 20 to support and lift up the rim assembly R until the fitting projection 18A of the upper rim 7 engages with the rim fitting hole 16 of the upper spindle 4, while simultaneously chucking the coupling member 19 by the lock means 17 to hold the upper rim 7 on the upper spindle 4 in a coupled state by one-touch action as shown in FIG. 6(VI). The slide table 28 is then retracted to shift the rim assembly transfer means 23 into a stand-by position outside the machine.

Figure 6V:
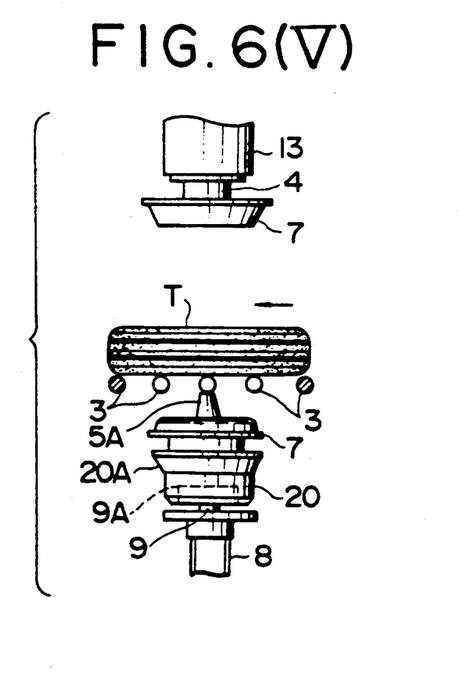

In the next place, the hydraulic cylinder 8 is operated to move the lower spindle 5 and the lower rim 10 together with the piston rod 9 into a position lower than the top end of the roller conveyer 3, while leaving the upper rim 7 on the upper spindle 4 to assume the position shown in FIG. 6(V). The testing tire T is then positioned immediately beneath the upper spindle 4 by the roller conveyer 3.

In this state, the hydraulic cylinder 8 is operated again to lift up the lower spindle 5 and the lower rim 10 together with the piston rod 9 to fit the lower rim 10 into one bead portion $B_2$ of the tire T in the manner as shown in FIG. 6(VI), and then lifted up further together with the tire T to fit the upper rim 7 into the other bead portion $B_1$ as shown in FIG. 2, gripping the tire T from the upper and lower sides by the upper and lower rims 7 and 10.

In this gripped state, after introducing pressurized air into the tire T through the air supply passages and through the air passages 42 and 43 to impart a predetermined internal pressure to the tire T, the upper spindle 4 is rotated by the drive mechanism 6 to test the uniformity of the tire T.

Upon finishing a predetermined test, the pressurized air in the tire T is discharged and the rotation of the upper spindle 4 is stopped, lowering the piston rod 9 through operation of the hydraulic cylinder 8 to disengage the tire T from the upper rim 7. The tire T is placed on the roller conveyer 3 and its bead portion $B_2$ is separated from the lower rim 10 as the tire T is lowered together with the lower rim 10, which is further lowered to a position beneath the roller conveyer 3 as shown in FIG. 6(V) to stand by for the next tire loading. While the tested tire is transferred to a next line by the roller conveyer, a next testing tire of the same kind is delivered to a position immediately beneath the upper spindle 4 to fit the rims in the same manner as described above.

In case of a change in tire size or shape, the lower spindle 5 and the lower rim 10 are lifted up through operation of the hydraulic cylinder 8 to plunge the fitting shaft portion 5A of the lower spindle 5 into the fitting hole 18B of the upper rim 7, and the lock means 17 is released through operation of the rod 15, returning the rim assembly R to the state of FIG. 6(VI). Nextly, the rotary actuator 30 is operated to turn the rotary arm 26 toward the machine while advancing the slide table 28 by the air cylinder 29 to bring the center C of the spigot socket portion 31 into alignment with the extension line of the axis of the upper spindle 4, assuming the state indicated by two-dot chain line 28 in FIG. 6(IV). The piston rod 9 is then lowered through operation of the hydraulic cylinder 8 to hand over the rim assembly R to the slide table 28 as shown in FIG. 6(III). After this, the slide table 28 is receded by the air cylinder 29, and the rotary arm 26 is turned through operation of the rotary actuator 30 into a position outside the machine as indicated by two-dot chain line 126 in FIG. 3, positioning the empty rim assembly support hole 33 immediately above the hand-over cylinder 38. The slide table 28 is then advanced by the air cylinder 29 to position the rim assembly R immediately above the hand-over cylinder 38 as indicated by two-dot chain line $R_2$ in FIG. 6(I), and the rod 39 is lifted up through operation of the hand-over cylinder 38, inserting the support head 40 into the fitting hole 22 of the lower spindle holder 20 to support the rim assembly R thereon, and further lifted up in a slight degree into the position indicated at $R_1$ in FIG. 6(I), followed by retraction of the slide table 28. Succeedingly, the rod 39 is lowered through operation of the rim assembly hand-over cylinder 38 to fit and support the body portion 20A of the rim assembly R in a support hole 33 on the rim rack 32, and the rod 39 is lowered to a lower limit position as indicated by solid line in FIG. 6(I).

Thereafter, a rim assembly corresponding to an altered tire size is positioned immediately above the rim assembly hand-over cylinder 38 by rotating the rim rack 32 to mount same on the upper spindle 4 according to the above-described steps of rim mounting procedure.

Figure 7:
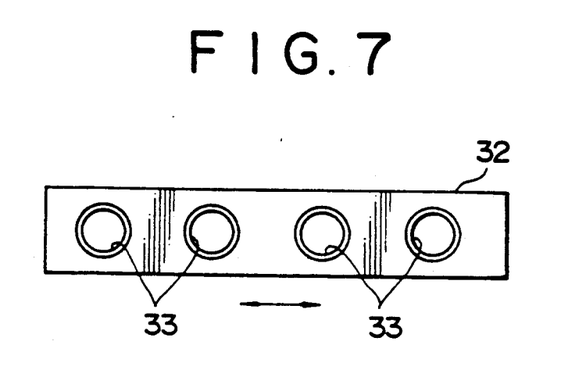
FIG. 7 is a plan view of a modification of the rim rack.

Referring to FIG. 7, there is shown in a schematic plan view a modification of the rim rack 32, which is reciprocable in horizontal directions through operation of an air cylinder or a motor-driven screw (not shown). Similarly to the above-described rotary table, a plural number of tapered holes are provided in a row for supporting rim assemblies therein.

Figure 8:
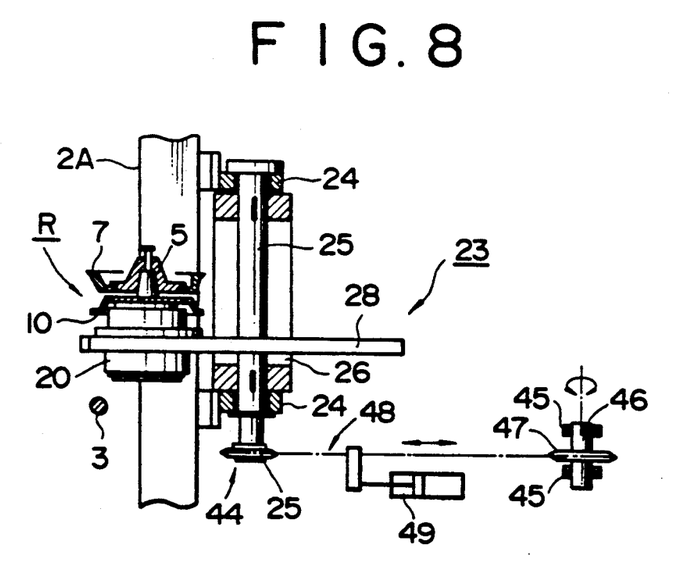
FIG. 8 is a partly sectioned side view of another embodiment of the rotary arm drive means of the rim assembly transfer means.

Shown in FIG. 8 is another embodiment of the drive mechanism for the rotational shaft 25 of the rim assembly transfer means 23. In this embodiment, an endless chain 48 is passed around a transmission sprocket 44 which is fixedly mounted on the lower end of the rotational shaft 25 and a transmission sprocket 47 which is mounted at a suitable position on the frame through bearing 45 and shaft 46, moving the chain 48 by an air cylinder 49 to turn the rotational shaft 25 through a predetermined angle.

It is to be understood that the present invention is not restricted to the particular forms shown in the foregoing embodiments. For example, the rotational shaft 25 may be turned by a drive lever which is fixed on the rotational shaft 25 and arranged to be pushed by an air cylinder at the time or rotation of the shaft 25. Further, the lock means for holding the upper rim 7 on the upper spindle 4 may employ the same mechanism as in the conventional counterpart if desired.

As clear from the foregoing description, in a tire uniformity machine including on the side of the upper and lower spindles 4 and 5 an upper rim 7 and a lower rim 10 to be fitted in bead portions $B_1$ and $B_2$ of a tire T, respectively, and arranged to lift up the tire by a tire transfer means 3, grip the tire from the upper and lower sides by means of the upper and lower rims and rotate the tire T about its axis by rotation of the upper spindle 4 about the axis thereof, the present invention provides a rim setting mechanism which is characterized by the provision of a rim assembly transfer means 23 adapted to deliver a rim assembly R, formed by assembling together an upper rim, a lower rim and a lower spindle outside the machine, to a position above the tire transfer means 3 and in vertical alignment with the axis of the upper spindle 4 and to dismantle a tested tire from the machine at a position immediately beneath the upper spindle 4, permitting to reduce the lower space, especially, to reduce the height of the space beneath the tire transfer means 3, and to shorten the stroke length of a hydraulic cylinder serving as a lift means for enhancing the tire testing efficiency while simplifying the internal construction of the tire uniformity machine. Besides, since the rim assemblies R are prepared outside the machine, the assembling job becomes easier and more efficient.

What is claimed is:

1. A rim mounting mechanism for a tire uniformity machine having a tire transfer means, said tire uniformity machine having on the side of upper and lower spindles an upper rim and a lower rim to be fitted in bead portions of a tire, respectively, and means arranged to lift up the tire transferred by the tire transfer means, grip said tire from the upper and lower sides thereof by said upper and lower rims and rotate said tire about the axis thereof by rotation of said upper spindle about the axis thereof, wherein said rim mounting mechanism comprises:

rim assembly transfer means independent of said means to lift up the tire and cooperatively positioned in proximity to said upper spindle for delivering a rim assembly, prepared by assembling together an upper rim, a lower rim and a lower spindle at a place outside the machine, to a position above said tire transfer means and in vertical alignment with the axis of said upper spindle; and means for removing a tested tire from the machine at a position immediately beneath said upper spindle.

2. A rim mounting mechanism as defined in claim 1, wherein said rim assembly transfer means comprises:

a rotational shaft mounted rotatably in a vertical position on a machine frame;

a rotary arm having one end thereof fixedly connected to said rotational shaft, a slide plate fixedly connected to the other end of said rotary arm;

a slide table and a slide drive means slidably mounted on said slide plate, said slide table comprising means for supporting a rim assembly; and a rotary actuator connected to the lower end of said rotational shaft for rotating said rotational shaft, so that a rim assembly supported by said slide table may be transferred.

3. A rim mounting mechanism as defined in claim 2, wherein said rim assembly support means comprises a spigot socket portion of said slide table for receiving therein a spindle holder of said lower lower spindle, and moved by operation of said rotary arm and slide drive means between an outer position in vertical alignment with a rim assembly holder on a rim rack and an inner position in vertical alignment with said upper spindle.

4. A rim mounting mechanism as defined in claim 3, wherein said spigot socket portion is in the form of a tapered hole having a notch at the outer end thereof.

5. A rim mounting mechanism as defined in claim 3, wherein said rim rack is circular in shape and provided with a plural number of rim assembly holders in a circular row.

6. A rim mounting mechanism as defined in claim 5, wherein said rim assembly holders are in the form of a tapered hole and adapted to receive therein a correspondingly tapered body portion of said lower spindle holder.

7. A rim mounting mechanism as defined in claim 3, wherein said rim rack has a rectangular shape and is provided with a row of rim assembly holders along the length thereof.

8. A rim mounting mechanism as defined in claim 7, wherein said rim assembly holders are in the form of a tapered hole and adapted to receive therein a correspondingly tapered body portion of said lower spindle holder.

* * * * *